US009441830B2

United States Patent
Truong et al.

(10) Patent No.: US 9,441,830 B2
(45) Date of Patent: Sep. 13, 2016

(54) DISPLAY DEVICE WITH CHAIN FOR ACTUATING LIGHT SOURCE ON THE DISPLAY DEVICE

(71) Applicant: Lenovo (Singapore) Pte. Ltd., New Tech Park (SG)

(72) Inventors: Cuong Huy Truong, Cary, NC (US); David Wayne Hill, Cary, NC (US); John David Swansey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/539,560

(22) Filed: Nov. 12, 2014

(65) Prior Publication Data

US 2015/0159860 A1     Jun. 11, 2015

Related U.S. Application Data (63) Continuation-in-part of application No. 14/099,264, filed on Dec. 6, 2013, now Pat. No. 9,212,815.

(51) Int. Cl.
*F21V 33/00* (2006.01)
*G06F 1/16* (2006.01)
*F21V 23/00* (2015.01)
*F21V 23/04* (2006.01)
*F21Y 101/02* (2006.01)
*F21Y 103/00* (2016.01)

(52) U.S. Cl.
CPC ......... *F21V 33/0052* (2013.01); *G06F 1/1601* (2013.01); *F21V 23/001* (2013.01); *F21V 23/0464* (2013.01); *F21Y 2101/02* (2013.01); *F21Y 2103/003* (2013.01); *G06F 2200/1612* (2013.01)

(58) Field of Classification Search
CPC ........... F21V 33/0052; F21V 23/0464; F21V 23/001; G06F 1/1601; G06F 2200/1612; F21Y 2103/003; F21Y 2101/02
See application file for complete search history.

(56) References Cited

U.S. PATENT DOCUMENTS

| 6,771,333 B2 | 8/2004 | Tanaka et al. |
| 7,293,890 B2 | 11/2007 | Chang |
| 2002/0063816 A1* | 5/2002 | Nakamura ........ G02F 1/133308 349/65 |
| 2007/0165406 A1 | 7/2007 | Wang |
| 2014/0168937 A1* | 6/2014 | Kato ...................... F21V 23/04 362/23.03 |

OTHER PUBLICATIONS

Cuong Huy Truong, John David Swansey, David Wayne Hill, "Computer Display with Bottom Illumination to Illuminate Key-Based Input Device", related U.S. Appl. No. 14/099,264, Non-Final Office Action dated Jun. 25, 2015.

(Continued)

*Primary Examiner* — Anne Hines
*Assistant Examiner* — Jose M Diaz
(74) *Attorney, Agent, or Firm* — John L. Rogitz; John M. Rogitz (57) ABSTRACT

In one aspect, a device includes a housing with a top portion and a bottom portion, a display coupled to at least a portion of the housing, at least one light source coupled to at least a portion of the bottom portion of the housing, and a cord coupled to at least a portion of the device. The cord protrudes from at least a portion of the device and is manipulable to actuate the light source to project light downwardly at an oblique angle with respect to a top to bottom dimension established between the top portion and the bottom portion.

22 Claims, 6 Drawing Sheets (56) References Cited

OTHER PUBLICATIONS

Cuong Huy Truong, John David Swansey, David Wayne Hill, "Computer Display with Bottom Illumination to Illuminate Key-Based Input Device", related U.S. Appl. No. 14/099,264, Applicant's response to Non-Final Office Action file Jun. 25, 2015.

Cuong Huy Truong, David Wayne Hill, John David Swansey, "Display Device with Chain for Actuating Light Source on the Display Device" complete filing package of related U.S. Appl. No. 14/099,264, filed Dec. 6, 2014.

Cuong Huy Truong, John David Swansey, David Wayne Hill, "Computer Display With Bottom Illumination to Illuminate Key-Based Input Device", related U.S. Appl. No. 14/099,264, Final Office Action dated Jul. 23, 2015.

Cuong Huy Truong, John David Swansey, David Wayne Hill, "Computer Display With Bottom Illumination to Illuminate Key-Based Input Device", related U.S. Appl. No. 14/099,264, Applicant's response to Final Office Action filed Aug. 17, 2015.

* cited by examiner

| Ambient Light Level | Visibility | Display Brightness |
|---|---|---|
| 1 | Excellent | 1.5 |
| 2 | Good | 2 |
| 3 | Poor | 2.5 |
| 4 | Bad | 3 |

FIG. 12

DISPLAY DEVICE WITH CHAIN FOR ACTUATING LIGHT SOURCE ON THE DISPLAY DEVICE

I. FIELD

The present application relates generally to a display device with a chain for actuating a light source on the display device.

II. BACKGROUND

Computer users often prefer low ambient lighting in general but need light to illuminate keyboards, touchpads, or other key-based input devices and/or peripheral devices, so that they can see details of the peripheral devices such as the keys in darkened locations. As understood herein, individual lamps may be placed e.g. on the keyboard under each key, but this undesirably requires a large number of lamps, constitutes a drain on the battery of a wireless keyboard, and produces uneven lighting and/or glare shining directly up through each individual key and around the keys, producing distracting bright spots.

SUMMARY

Accordingly, in one aspect a device includes a housing comprising a bay on at least a portion thereof, a display coupled to at least a portion of the housing, at least one light coupled to at least a portion of the housing, and a cord coupled to at least a portion of the device. The cord protrudes from at least a portion of the device and has at least a portion that is positionable at least partially in the bay. The cord is manipulable to actuate the light.

In another aspect, a method includes providing a housing for a device, providing a display coupled to at least a portion of the device, providing at least one light source coupled to at least a portion of the device, and providing a pull chain coupled to at least a portion of the device. The pull chain hangs from the device relative to the device being positioned upright on a surface, and the pull chain is manipulable to actuate the light source.

In still another aspect, an apparatus includes a frame defining at least a top portion and a bottom portion, a display coupled to the frame which presents images under control of a processor, and at least one illuminator energizeable to generate light. The illuminator is arranged along at least a portion of the bottom portion of the frame. The apparatus also includes a chain protruding from the bottom portion that is pullable to actuate the at least one illuminator to project light downwardly at an oblique angle with respect to a top to bottom dimension established between the top portion and the bottom portion.

In yet another aspect, a device includes a housing, a display coupled to at least a portion of the housing, at least one light coupled to at least a portion of the housing, and a cord coupled to at least a bottom portion of the housing relative to the device being positioned upright on a surface. The cord protrudes from at least a portion of the device near the bottom portion of the housing and is manipulable to actuate the light. Furthermore, the cord is of a length not to exceed a distance from a point at which the cord couples to the bottom portion of the housing to the top of the surface when die device is placed with a back portion of the housing on the surface.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone. C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
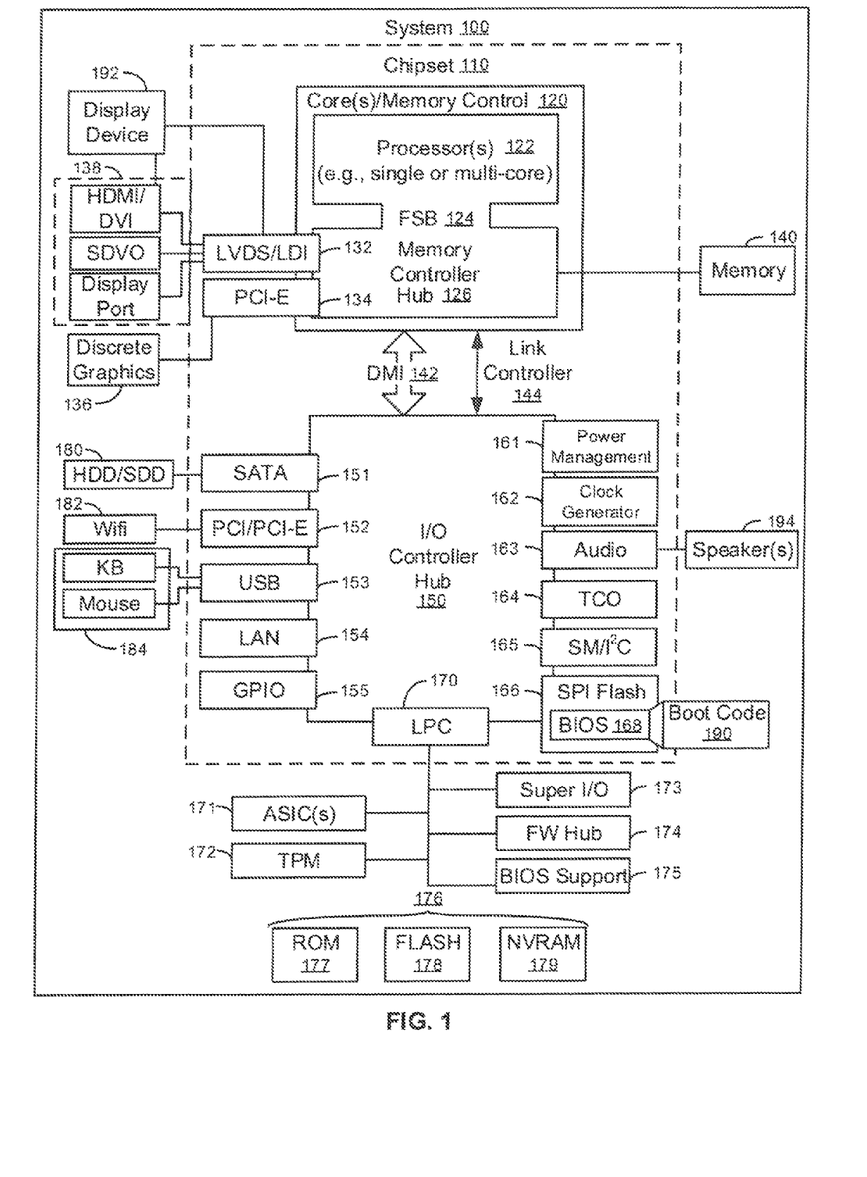
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX, or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PC-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
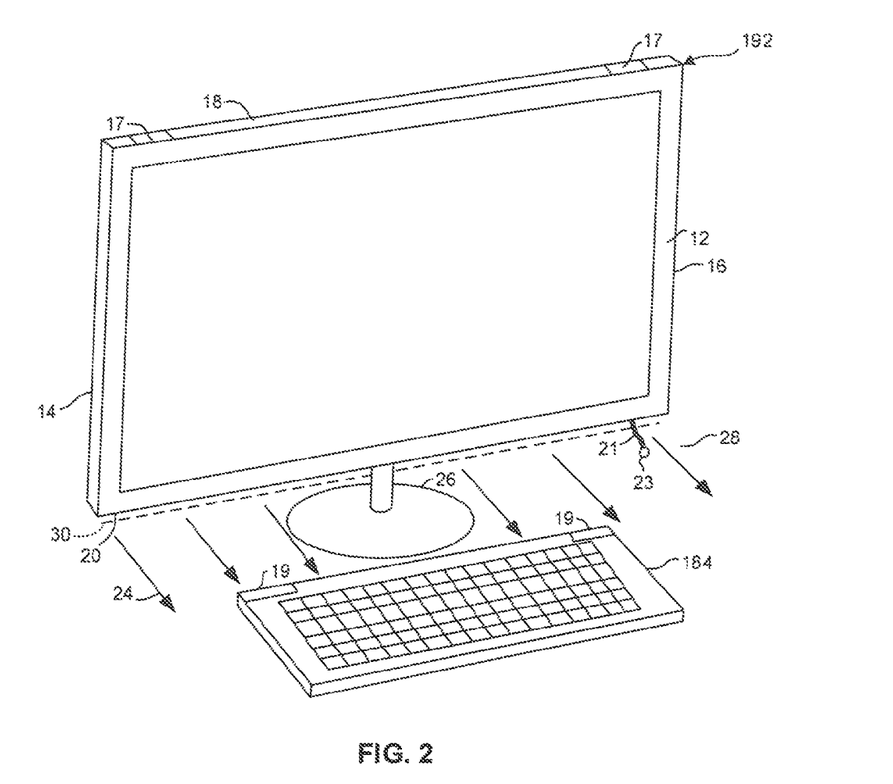
FIG. 2 is a perspective view of a display looking at the front of the display with bottom lamps to illuminate a key-based input device, schematically showing light from lamps on the bottom edge of the display illuminating the input device.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Now in reference to FIG. 2, it shows that the display apparatus 192 can include a video display member 10 that is configured for presenting demanded images. The demanded images are presented on the front of the display member 10, which is the side of the display member 10 shown. A frame and/or housing (which may be referred to as a bezel) 12 can bound all or part of the typically rectilinear periphery of the display member 10. Accordingly, the frame 12 can have left, right, top, and bottom sides defining respective left, right, top, and bottom edges 14, 16, 18, 20 as shown. In some embodiments the display member 10 can overlap the frame 12, so that while the frame 12 remains present it may not be visible from the front of the apparatus looking at the display member 10.

The display apparatus 192 also includes at least one ambient condition sensor 17 such as e.g. a light sensor for sensing current ambient light, a visibility sensor and/or camera for sensing current visibility levels, a humidity sensor for sensing current ambient humidity, etc. Also, note that the key-based input device 184 may include one or more such ambient condition sensors 19 and be in communication with the display apparatus 192 to provide input thereto from the sensors 19 for undertaking present principles.

Still in reference to the display apparatus 192 as shown in FIG. 2, it also includes a cord, chain (e.g. pull chain), and/or strap 21 coupled to at least a portion of the display apparatus 192 such as e.g. a bottom panel of the frame 12. It may be appreciated from FIG. 2 that the cord 21 protrudes downward and/or hangs from the display apparatus 192 relative to the display apparatus 192 being positioned upright on a surface as shown in FIG. 2. The cord 21 may also comprise a spherical element 23 (e.g. a finial) on an end thereof that is opposed to an end of the cord 21 which engages with the display apparatus 192 to hang therefrom. In some embodiments, one or more portions of the cord 21, such as the spherical element 23, may be comprised of one or more metals that are e.g. attractable to a magnet.

Figure 3:
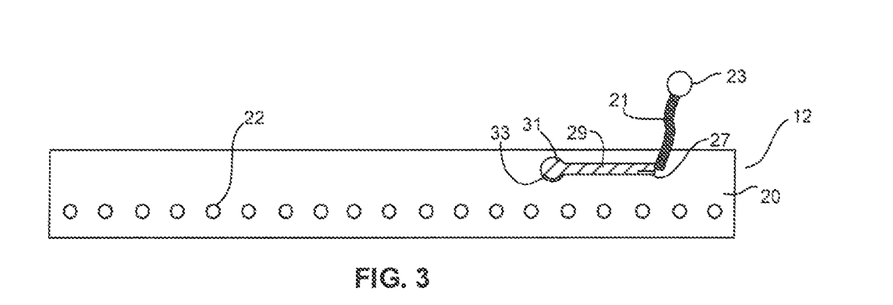
FIG. 3 is a bottom plan view of the display, showing a row of light emitting diodes (LEDs) arranged along the bottom edge of the display.
Figure 4:
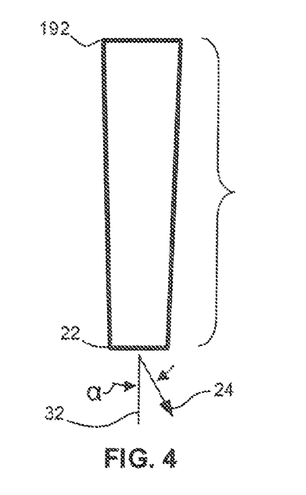
FIG. 4 is a side elevational view of the display schematically illustrating the angle at which the LEDs in FIG. 3 direct light.

In cross-reference to FIGS. 2-4, at least one and preferably a row of illuminators 22 (FIG. 3) such as lamps, e.g., light emitting diodes (LEDs), liquid crystals, and combinations thereof, are juxtaposed with the bottom edge 20 of the frame 12. In the example shown in FIG. 3 the illuminators 22 are mounted on the bottom-facing horizontal edge of the frame 12. In other examples the illuminators may be mounted on the bottom portion of the frame but above the horizontal bottom edge, e.g., the illuminators may be mounted on the front-facing or rear-facing vertical sides of the bottom portion of the frame.

As shown best in FIGS. 2 and 4, the illuminators emit light beams 24 that are directed by the apparatus downwardly and in front of the display member 10 and/or display apparatus 192 to illuminate the top surface of objects in front of the display member 10 and/or display apparatus 192 such as the key-based input device 184 that typically are disposed on the same surface as the display apparatus 192. Even further, in some embodiments the input device 184 may have one or more reflecting elements 25 (which may in other embodiments be refracting elements) configured for reflecting light at least from the illuminators 22. For example, in embodiments where the input device 184 is a keyboard, each key on the keyboard may include at least one reflecting element 25, and furthermore the reflecting elements 25 may even be e.g. configured on each respective key to represent the character associated with the respective key such that e.g. a letter "A" is formed by a reflecting element 25 on a top surface of the key for the letter "A." In addition to or in lieu of the foregoing, a reflecting element 25 may be positioned along at least one and even all four top edges of each of the keys to thereby provide at least a partial key outline for each key. As another example, in embodiments where the input device 184 is a mouse, a reflecting element 25 may at least partially circumscribe an outer periphery of a scroll wheel of the mouse.

In either case, it is to be understood that the reflecting elements 25 may be configured from any suitable reflecting material, and even e.g. may include materials for reflecting black light such as black light reflective paint and/or material, ultraviolet reactive paint and/or material, neon paint and/or material, glow in the dark paint and/or material, so called "tattoo ink" and/or "tattoo material" that is e.g. invisible to the human eye absent black light but appears (e.g. glows) under black lighting. Accordingly, present principles recognize that in some embodiments the illuminators 22 may emit UV light such as black light.

Still in reference to the illuminators 22, it is to be understood that in accordance with present principles, manipulation of the cord 21 (e.g. pulling the cord 21 down and/or away from the display apparatus 192 relative to the apparatus 192 being positioned upright as shown) automatically actuates the illuminators 22 to turn on and/or illuminate from an off configuration, and to turn off or cease to illuminate from an on configuration. In some embodiments, the cord 21 may be mechanically coupled to an actuation element for the illuminators 22 to thus actuate the illuminators 22 in response to e.g. a pull of the cord 21 beyond a threshold point and/or threshold amount for actuation of the illuminators 22, while in other embodiments the cord 21 may be electrically coupled to the actuation element of the illuminators 22 and/or to the illuminators 22 themselves to (e.g. under control of a processor such as the processor 122) in response to manipulation of the cord 21 actuate the illuminators 22. Thus, in embodiments comprising electric coupling of the cord 21 to the illuminators 22, manipulation of the cord 21 may cause a signal to be generated (e.g. from a manipulation sensor sensing manipulation of the cord 21) and provided to the processor 122, which in turn may command the illuminators 22 to actuate from off to on or on to off.

Still in cross-reference to FIGS. 2-4, in the embodiment of FIG. 2 the display apparatus 192 is mounted on a base 26 that is disposed on a flat horizontal surface 28, as is the input device 184. A dashed line 30 indicates the portion of the surface 30 that is directly below the bottom edge 20 of the frame 12, with substantially all light from the illuminators 22 being directed downwardly forward of the line 30.

In other words, as best illustrated in FIG. 4, a top-to-bottom dimension 32 is established from the top to the bottom of the display apparatus 192, and the light from the illuminators 22 is directed forward and down at an oblique angle α with respect to the top-to-bottom dimension 32, which may be a vertical or near-vertical dimension. In one embodiment, each illuminator emits light that spreads outwardly as it propagates, centered along a projection axis, and the illuminators 22 are oriented to point downwardly and outwardly toward the front of the display member 10 as shown such that the projection axis itself forms the angle α with the top-to-bottom dimension.

Specifically in reference to the bottom-plan view of the display apparatus 192 shown in FIG. 3, note that the cord 21 comprising the spherical element 23 is shown. The cord is engaged with the display apparatus 192 at a point 27, which may be located in a bay, recess, and/or inlet 29 or may be located on another portion of the bottom of the display apparatus 192 other than in the bay 29, such as e.g. proximate to one of the illuminators 22. Note that the bay 29 comprises at least one hollow semi-spherical portion 31 large enough to receive the spherical element 23 e.g. while other portions of the bay 29 may receive the rest or at least some of the cord 21.

Still further, note that at least a portion of the portion 31 may comprise a magnet 33 for attracting the special element 23 in embodiments where the spherical element 23 is comprised of a metal attractable to a magnet. In some embodiments the magnet 33 may be positioned in a deepest and/or furthest away portion of the portion 31 relative to the exterior of the bottom portion, while in other embodiments the magnet 33 may be positioned on the other side of the wall establishing the portion 31 (e.g. inside the frame) so that an attractive force may go through the wall to attract the element 23 while not having the magnet 33 make contact with the element 23.

What's more, note that in some embodiments the magnet 33 may extend into other parts of the bay 29 other than the portion 31 to e.g. attract other portions of the cord 21 other than the element 23 that may also be comprised of metal, and/or still other magnets may be positioned in other parts of the bay 29 other than the portion 31 for attracting one or more other parts of the cord 21 other than the element 23. Notwithstanding, in some embodiments the other parts of the bay 29 beside the portion 31 may not have a magnet positioned therein such that when the spherical element 23 is attracted into the hollow semi-spherical portion 31, at least some of the rest of the cord 21 may hang between the point 27 and portion 31 so that a user may grab or hold a portion of the chain and pull the element 23 from the portion 31 so that the cord 21 may hang as shown in FIG. 2.

Figure 5:
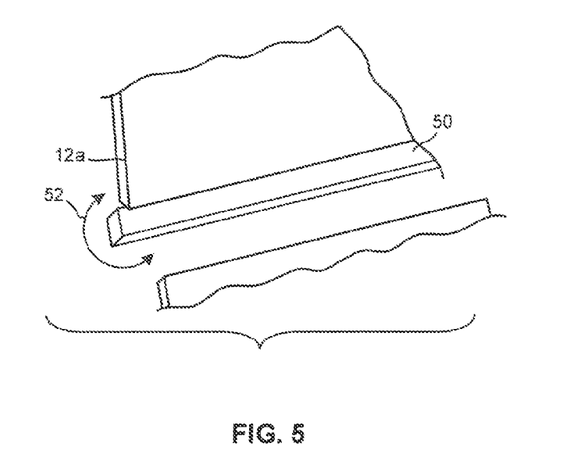
FIG. 5 is a perspective view with portions cut away, illustrating an alternate embodiment in which the LEDs are positioned above a diffuser or a reflector plate, which may be tiltably engaged with the display.
Figure 6:
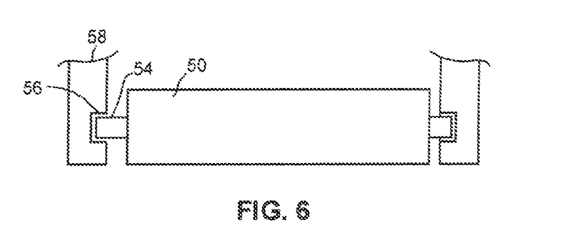
FIG. 6 is a schematic front elevational view of the plate shown in FIG. 5, with portions of the frame broken away for clarity.

Moving on in the detailed description, in some embodiments illuminators in accordance with present principles may be oriented to project light straight down (and/or e.g. downwardly along a vertical axis) from the bottom edge 22 of the frame 12, with a reflector or refractor interposed to redirect light along a redirection axis that forms the oblique angle α with the top-to-bottom dimension. For example, a display frame 12a is shown in FIG. 5, and an opaque reflecting plate (equivalently, a transparent or translucent refracting plate) 50 is coupled to the frame 12a to reflect (or refract) light along the redirection axis. Or, the plate 50 may be made of a translucent diffusing material that diffuses light that passes through it. In any case, the plate 50 may be pivotably coupled to the bottom portion of the frame 12a for tilting motion as indicated by the arrows 52. In an example shown in FIG. 6, small cylindrical axles 54 may protrude from the left and right edges, respectively, of the plate 50 and may engage respective holes or openings 56 formed in respective left and right bottom extensions 58 of the frame 12a in a close interference fit, so that a person can tilt the plate 50 by hand to redirect light at a desired angle onto the input device in front of the display apparatus 192.

Figure 7:
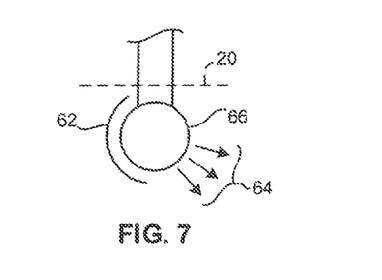
FIG. 7 is a side elevational view of an example light in a row of lights on the display with a reflector or refractor directing light at an angle in accordance with present principles.

Now in reference to FIG. 7, it shows is a side elevational view of an example light emitting diode (LED) 60 in a row of lights on (e.g. a bottom portion of) a display apparatus in accordance with present principles, with a reflector or refractor 62 directing light at plural angles from e.g. an angle at least substantially parallel to a top-to-bottom (e.g. vertical) display angle to e.g. an oblique angle as set forth herein. Note that the reflector or refractor 62 may be e.g. coupled to a portion of the frame 12 such as the bottom edge 20, and/or may be coupled to a portion of the LED 60 itself. In embodiments where the reflector or refractor 62 is a reflector, the reflector may be a mirror. In embodiments where the reflector or refractor 62 is a refractor, the refractor may be a light diffuser. In any case, it may be appreciated from FIG. 7 that light beams 64 are emanating at plural angles downwardly and outwardly (e.g. frontally relative to a display member of the display) of the from the LED 60/reflector or refractor 62 assembly.

Without reference to any particular figure, it is to be understood that movement of e.g. a reflecting plate such as the plate 50 described above and/or the LED 60/reflector or refractor 62 assembly also described above may be automated such that e.g. such elements may dynamically move based on the location of a peripheral device to direct light toward to peripheral device. For instance, assume that a processor on the peripheral device transmits its location (e.g. GPS coordinates as determined using a GPS transceiver on the peripheral device) using a peripheral device transceiver to a processor on the display apparatus 192 through a display transceiver. The processor on the display apparatus 192 may thus use the GPS coordinates of the peripheral device to determine the location of the peripheral device relative to the display apparatus 192 (e.g. using a GPS transceiver on the display apparatus 192) to adjust (e.g. automatically without user input) a reflecting plate, reflecting assembly, etc. thereon to direct light toward the peripheral device at its (e.g. indicated) location.

Figure 8:
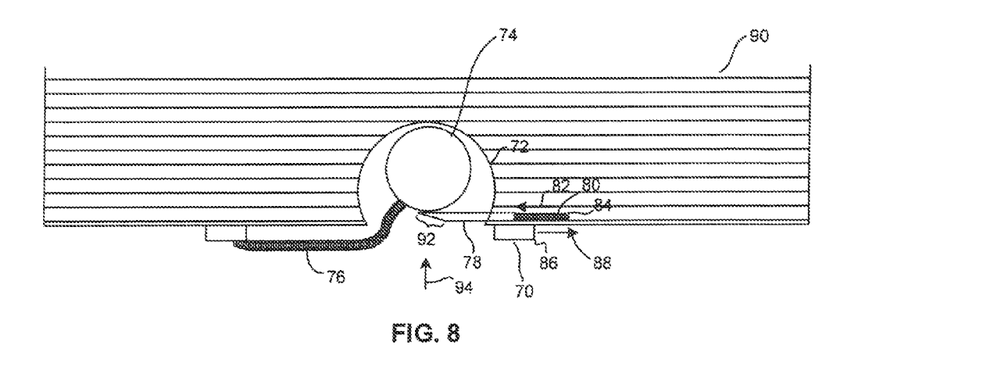
FIG. 8 is a side elevational view of an example bay and spring-actuated mechanism in a display, with portions cut away for clarity.

Continuing the detailed description in reference to FIG. 8, it shows a side elevational view of an example spring-actuated mechanism 70 in a bay and/or inlet 72 for holding a spherical element 74 of a cord and/or chain 76 which is engaged with a display apparatus. It is to be understood that the example embodiment of FIG. 8 may be used in conjunction with, or in lieu of, using a magnet to removably engage a spherical element of a cord as described above in reference to FIG. 3. Accordingly, though not shown, in some embodiments the bay 72 may comprise a magnet for attracting a metallic portion of the cord 76 such as the spherical element 74.

In any case, it may be appreciated from FIG. 8 that the spherical element 74 has been placed in a hollow semi-spherical portion of the bay 72, and is held in place by a pin 78 which comprises part of the spring-actuated mechanism 70. The pin 78 extends laterally into the bay 72 and/or to prevent the element 74 from being removed from the bay 72 when positioned therein. The pin 78 is coupled to a spring 80 which may exert a force on the pin 78 in the direction of arrow 82 from an anchor point 84. A slider 86 also forms part of the spring-actuated mechanism 70 and is laterally slideable under force from a person in the direction of arrow 88 and laterally slideable under force from the spring 80 in the direction of arrow 82. Thus, when a user wishes to remove the spherical element 74 from the bay 72 to pull the cord 76 and thus actuate a light in accordance with present principles, the user may slide the slider 86 in the direction of arrow 88, thereby causing the pin 78 to at least partially retract into the frame 90 to allow the element 74 to be removed from the bay 72 (e.g. by a user and/or based on gravity) owing to it no longer being obstructed from removal by the pin 78.

Before moving on, it is to be understood that the pin 78 may include an angled portion 92. When the spherical element 74 is in a location other than the bay 72 and a user wishes to place the element 74 in the bay 72, the user may position the element 74 to abut the angled portion 92 and exert a force on the element 74 in the direction of arrow 94 to thus exert a lateral force on the pin 78 toward the anchor point 84 to thus compress the spring 80. Once the lateral force is removed (e.g. based on the element 74 sliding past the pin 78 as force is exerted in the direction of arrow 94), the spring 80 exerts a force in the direction of arrow 82 thus causing the pin 78 to extend back at least partially into the bay 72 to obstruct the element 74 from e.g. falling from the bay 72 under gravity.

Figure 9:
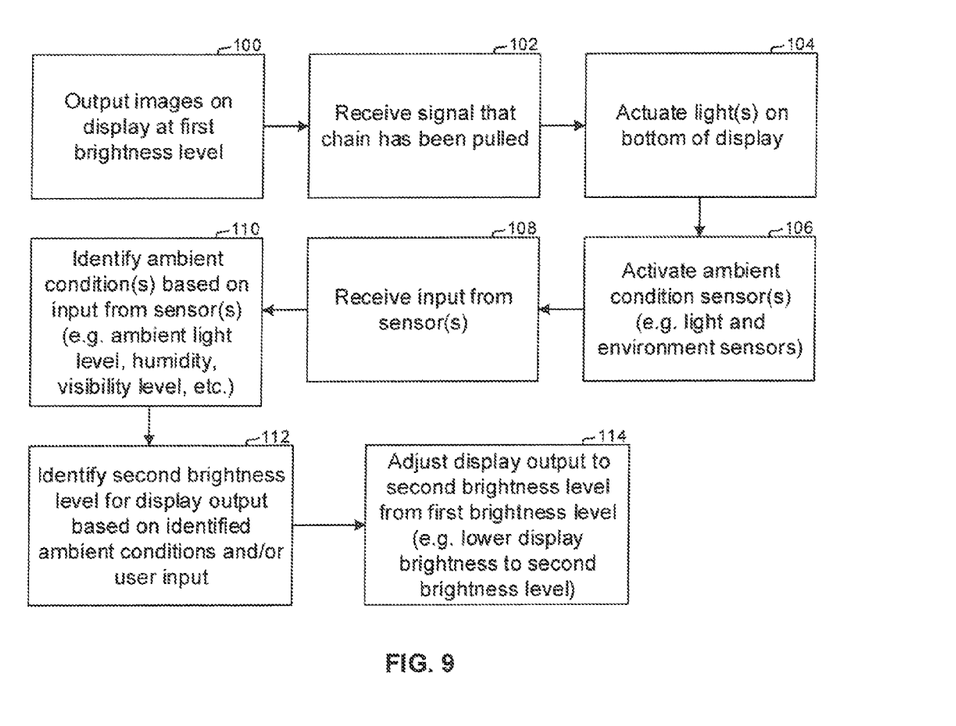
FIG. 9 is a flow chart showing an example algorithm in accordance with present principles.

Now in reference to FIG. 9, is shows example logic that may be undertaken by a device such as the system 100 in accordance with present principles. Beginning at block 100, the logic outputs one or more images on a display at a first brightness level. The logic then moves to block 102 where the logic receives a signal that a chain such as the chain 21 described above has been manipulated (e.g. pulled). Responsive to receiving the signal, the logic moves to block 104 where the logic actuates one or more lights on a bottom of the display in accordance with present principles.

The logic then moves to block 106 where the logic activates one or more ambient condition sensors on the device undertaking the present logic, such as e.g. ambient light sensors and/or other environment sensors. The logic then moves to block 108, at which the logic receives input from one or more of the sensors that were activated at block 106. Responsive to receiving the input at block 108, the logic moves to block 110 where it identifies one or more ambient conditions based on the input from the sensors, such as e.g. an ambient light level, ambient humidity, an ambient visibility level, etc. Responsive to identification of at least one ambient condition, the logic moves from block 110 to block 112.

At block 112 the logic identifies a second brightness level different from the first brightness level at which to output images on the display based on the identified ambient conditions. In addition to or in lieu of identifying the second brightness level based on the identified ambient conditions, the second brightness level may be bused on e.g. user input of a desired brightness level for display output when the one or more lights are also actuated to an on configuration. In any case, after block 112 the logic proceeds to block 114, where the logic adjusts display output to the second brightness level from the first brightness level.

In some embodiments, the second brightness level may be less than the first brightness level. A device undertaking present principles may reduce brightness from the first level to the second level based on one or more other lights on the display being actuated to an on configuration since e.g. the other lights for illuminating a keyboard would be more appropriate in a relatively low ambient light environment where a relatively higher display output brightness would not be desired owing to the low ambient light environment and could even be e.g. uncomfortable to a user owing to the contrast between his or her relatively dark surroundings and the relatively bright display output. Still another reason e.g. a user may configure the second brightness level to be less than the first brightness level may be e.g. when ambient visibility is relatively clear and hence it may be easier to view images on the display without the display output being relatively high. Conversely, it may be desired to configure the second brightness level to be brighter than the first brightness level when e.g. visibility is relatively poor and hence it may be difficult to see portions of images presented on the display at a relatively low brightness display output level.

Figure 10:
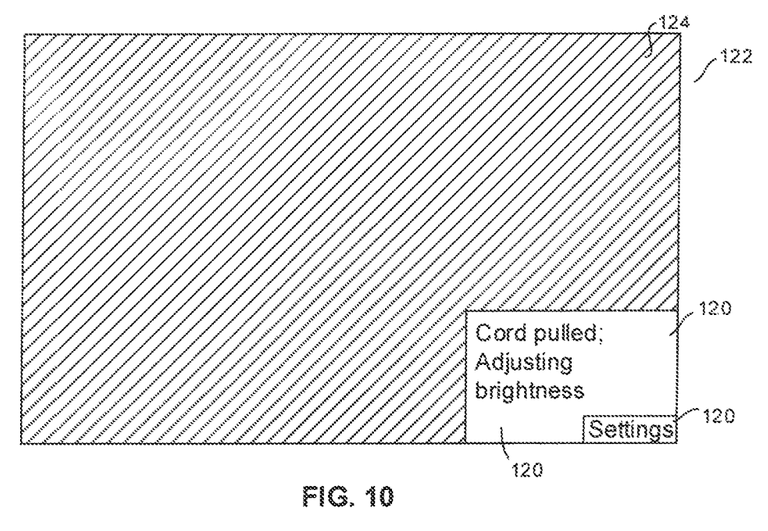
FIGS. 10 and 11 are example user interfaces (UI) in accordance with present principles.

Before moving on to the description of FIG. 10, it is to be understood that the blocks of the logic shown in FIG. 9 need not be executed in the particular example order shown. For example, in some embodiments the logic may actuate one or more ambient condition sensors while actuating the display at the first brightness level, continually receive ambient condition input from the sensors, and continually determine an appropriate second brightness level so that when e.g. a cord is pulled and lights are turned on in response, the display brightness may (also in response) relatively more quickly change from the first brightness level to the second brightness level.

Now in reference to FIG. 10, it shows an user interface (UI) 120 presented on a display 122 which is presenting images 124 on at least a portion thereof. The UI 120 includes an indication 126 that a cord such as the cord 21 described above has been manipulated and that display brightness is being adjusted in response. The indication 126 may be presented when lights on a bottom portion of the display 122 are turned on or off. Furthermore, though not shown, in some embodiments the indication 126 may indicate whether the display brightness is being adjusted up or down, and/or to brighter or dimmer.

The UI 120 also comprises a settings selector element 128 which is selectable to automatically in response thereto present a settings user interface on the display 122 for e.g. adjusting settings of the device for undertaking present principles. An example of such a settings UI is shown in FIG. 11.

Figure 11:
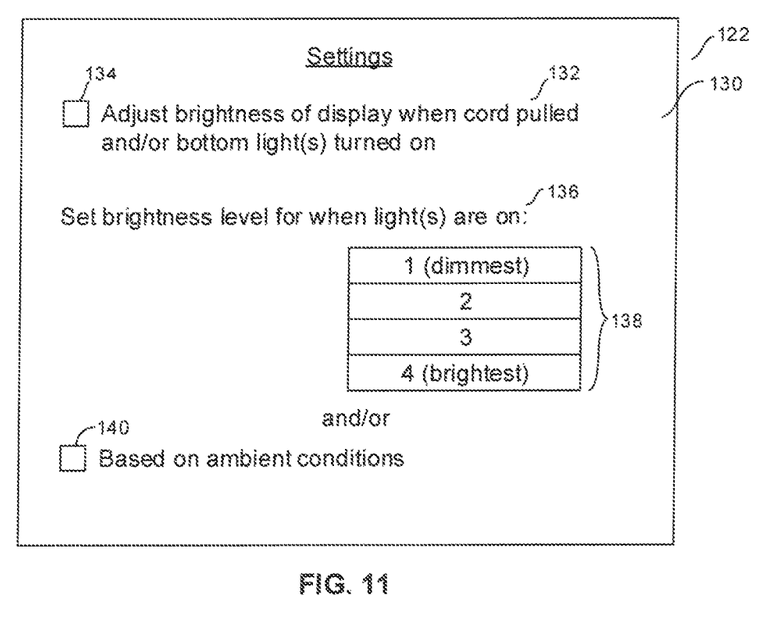

Thus, FIG. 11 shows a settings UI 130 presented on the display 122. The settings UI 130 includes a first setting 132 for whether to adjust display brightness when a cord such as the cord 21 is pulled and/or when lights such as the illuminators 22 are actuated to an on position in which they emit light. Thus, a check box 134 is provided for selection to configure the device and/or display 122 to adjust display brightness accordingly. Conversely, when the check box 134 is checked and it is selected (e.g. unchecked), the device will thereafter not adjust display brightness when the cord is pulled and/or the illuminators are on.

A second setting 136 is shown for a user to establish a desired brightness level for when illuminator such as the illuminators 22 are on. Selector elements 138 are thus provided which respectively are associated with different brightness levels and are respectively selectable to establish an associated display brightness level for when the illuminators are on. It may be appreciated that from top to bottom, each of the elements 138 is associated with a progressively more bright level.

Still further, the setting 136 may also comprise a check box 140 for user selection to adjust display brightness based on ambient conditions in addition to user input. Thus, when the check box 140 is checked and one of the elements 138 is selected, a device undertaking present principles may adjust display brightness based on both user preference and ambient conditions. E.g., responsive to one or more illuminators being turned on, a user-specified brightness level may be identified based on which of the elements 138 is selected. Thereafter the user-specified brightness level may be automatically adjusted up or down based on ambient conditions but not so far up or down to establish a brightness level from one of the other elements 138 not selected by the user. For example, if the user selected a display brightness level of two using the respective element 138 for brightness level two, and ambient light conditions are determined to be relatively low, the actual display brightness level for output from the display 122 may be identified and adjusted to be less than two but not one, such as e.g. a display brightness level of one and three quarters.

Figure 12:
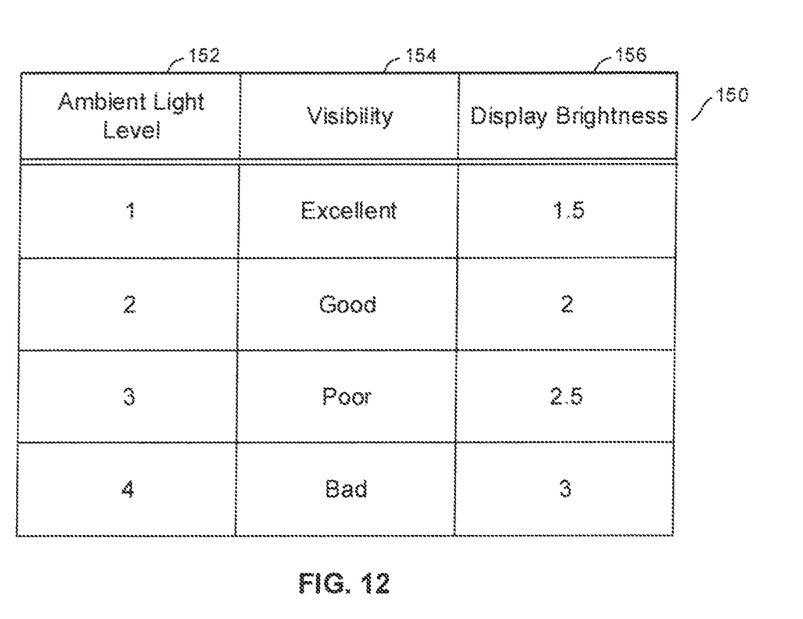
FIG. 12 is an example data table in accordance with present principles.

Before moving on to FIG. 12, it is to also be understood that should e.g. none of the selector elements 138 be selected but the check box 140 still be selected, user input will not be used to determine a display brightness level for when the illuminators are on, but instead a display brightness level may be identified automatically by the device without further user input based on ambient conditions alone.

Now in reference to FIG. 12, it shows an example data table 150 that may be accessed by a device undertaking present principles (e.g. undertaking the logic of FIG. 9) for identifying a display brightness level for display output based on ambient conditions and/or when one or more illuminators are turned on. Thus, to identify a display brightness level based on an ambient condition that has been identified based on input from one or more ambient condition sensors, the logic accesses the data table 150.

For an identified ambient light level, the logic may parse a column 152 of the table 150 until a match in the column 152 to the identified ambient light level is identified. The logic may then access and/or identify a display brightness level from column 156 at the same row as the identified ambient light level from column 152.

For an identified ambient visibility level, the logic may parse a column 154 of the table 150 until a match in the column 154 to the identified ambient visibility level is identified. The logic may then access and/or identify a display brightness level from column 156 at the same row as the identified ambient light level from column 154.

Without reference to any particular figure, it is to be understood that in addition to or in lieu of using one or both of a magnet and/or spring-actuated mechanism to engage a spherical element of a chain with a bay in accordance with present principles, the bay may be configured for an interference fit with the spherical element as well. Thus, a user may engage a spherical element of a chain with a bay using an interference fit, and may also disengage the spherical element from the bay by applying force to overcome the interference fit.

Also without reference to any particular figure, it is to be understood that a display apparatus in accordance with present principles may be an "all-in-one" computing device such that e.g. components the system 100 are incorporated into the housing of the display apparatus itself.

Again without reference to any particular figure, in some embodiments a chain in accordance with present principles may be pulled multiple times to perform different functions under control of the device's processor. More specifically, e.g. when the display of the display apparatus is not on and hence not presenting images, pulling the chain will power on the display itself. Pulling the chain again after the display has been powered on may turn on one or more illuminators on the bottom of the frame of the display apparatus. Pulling the chain a third time may then turn off both the display and the illuminators.

It may now be appreciated that present principles provide for e.g. a metal chain with a red-colored sphere at the end and which hangs underneath a computer display to allow a user to pull the chain to activate one or more "task" lights mounted underneath the display. The chain may be positioned on a bottom portion of the display and toward the front of the display which presents the images so that it is easily seen and easily pulled (e.g., positioned at or near a front, bottom corner of the display's frame). In example embodiments, the length of the chain is not long enough to extend down to a surface on which the display may be placed. Thus, e.g. even when a front of the display establishing a top-to-bottom dimension is oriented e.g. substantially horizontally and/or parallel to a surface on which the display is placed, the chain may remain easily accessible to a user. Thus, in example embodiments the chain is arranged on the housing of the display such that when oriented horizontally as referenced above, it will not be tucked under the display such that the user, when her or she is positioned in front of the display itself, is unable to pull the chain without reaching around at least a portion of the housing of the display other than the front portion at which the chain is disposed. In addition to the foregoing, in some embodiments the length of the chain may be such that when the display itself is placed with its back flat against another surface (such as e.g. a desk top), the chain placed toward the front portion of the display one or both does not touch the surface on which the back of the display is placed and/or be of a length such that it cannot tuck underneath the display itself. A storage compartment such as a bay allows the user to tuck away the chain when desired and/or to prevent damage to the chain during shipping of the display. Furthermore, in some embodiments the chain may interact with the display and/or computer system to allow for screen brightness reduction at the same time the task light is illuminated.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular DISPLAY DEVICE WITH CHAIN FOR ACTUATING LIGHT SOURCE ON THE DISPLAY DEVICE is herein shown and described in detail, it is to be understood that the subject matter which is encompassed by the present application is limited only by the claims.

What is claimed is:

1. A device, comprising:
   a housing comprising a bay on at least a portion thereof;
   a display coupled to at least a portion of the housing;
   at least one light coupled to at least a portion of the housing; and
   a cord coupled to at least a portion of the device, the cord protruding from at least a portion of the device, the cord having at least a portion that is positionable at least partially in the bay, the cord being manipulable by pulling to turn on the light.

2. The device of claim 1, wherein the cord is mechanically coupled to the light to actuate the light based on manipulation of the cord.

3. The device of claim 1, further comprising:
   a processor; and
   a memory accessible to the processor and bearing instructions executable by the processor to:
   actuate the light in response to manipulation of the cord.

4. The device of claim 1, wherein the at least one light is coupled to a portion of the housing to direct light downward and away from the device relative to the device being positioned upright on a surface.

5. The device of claim 4, wherein the cord is coupled to a portion of the device to protrude downward from the device relative to the device being positioned upright on a surface.

6. The device of claim 5, further comprising:
   a processor; and
   a memory accessible to the processor and bearing instructions executable by the processor to:
   in response to actuation of the at least one light based at least in part on manipulation of the cord, adjust a brightness output of the display from a first brightness level to a second brightness level.

7. The device of claim 6, wherein the second brightness level is less than the first brightness level.

8. The device of claim 6, wherein the second brightness level is determined based on user input.

9. The device of claim 6, wherein the second brightness level is determined based on at least one current ambient condition in an area in which the device is disposed.

10. The device of claim 6, further comprising at least one light sensor, and wherein the instructions are further executable to:
    receive input from the at least one light sensor;
    identify an ambient light level based on the input;
    identify the second display brightness based on the ambient light level; and
    in response to actuation of the at least one light, adjust the brightness output of the display from the first brightness level to the second brightness level.

11. The device of claim 6, further comprising at least one light sensor, and wherein the instructions are further executable, in response to actuation of the at least one light, to:
    receive input from the at least one light sensor,
    identify an ambient light level based on the input;
    identify the second display brightness based on the ambient light level; and
    adjust the brightness output of the display from the first brightness level to the second brightness level.

12. The device of claim 1, wherein the cord comprises at least one metallic portion, and wherein the bay comprises at least one magnet disposed in at least a portion of the bay for attracting the at least one metallic portion.

13. The device of claim 12, wherein the cord comprises a spherical element on a first end of the cord opposing a second end of the cord which is coupled to the device, wherein the spherical element comprises at least a portion which is metallic, wherein the bay comprises an at least semi-spherical portion, and wherein the at least one magnet attracts the spherical element at least partially into the at least semi-spherical portion.

14. The device of claim 1, wherein the cord comprises a spherical element on a first end of the cord opposing a second end of the cord which is coupled to the device, and wherein the bay comprises a spring-actuated mechanism for engaging the spherical element with the bay.

15. A method, comprising:
    providing a housing for a device;
    providing a display coupled to at least a portion of the device;
    providing at least one light source coupled to at least a portion of the device; and
    providing a pull chain coupled to at least a portion of the device, wherein the pull chain hangs from the device relative to the device being positioned upright on a surface, and wherein the pull chain is manipulable to actuate the light source.

16. The method of claim 15, further comprising:
providing an inlet in at least a portion of the housing;
wherein the pull chain has at least a portion that is positionable at least partially in the inlet.

17. The method of claim 15, further comprising:
providing a keyboard comprising at least one element positioned thereon that is structured to reflect light from the light source; and
wherein the light source is coupled to at least a portion of the device to project light downward therefrom relative to the device being positioned upright on a surface.

18. The method of claim 15, further comprising:
providing a processor; and
providing a memory accessible to the processor, the memory bearing instructions executable by the processor to, in response to actuation of the light source based at least in part on manipulation of the pull chain, adjust a brightness output of the display from a first brightness level to a second brightness level, wherein the first brightness level is not zero and wherein the second brightness level is not zero.

19. An apparatus, comprising:
a frame defining at least a top portion and a bottom portion;
a display coupled to the frame and which presents images under control of a processor;
at least one illuminator energizeable to generate light, the illuminator arranged along at least a portion of the bottom portion of the frame; and
a chain protruding from the bottom portion, the chain being pullable to actuate the at least one illuminator to project light downwardly at an oblique angle with respect to a top to bottom dimension established between the top portion and the bottom portion.

20. The apparatus of claim 19, further comprising a processor, and a memory accessible to the processor which bears instructions executable by the processor to, in response to at least one of a pull on the chain and actuation of the at least one illuminator, adjust a brightness output of the display from a first brightness level to a second brightness level.

21. A device, comprising:
a housing;
a display coupled to at least a portion of the housing;
at least one light coupled to at least a portion of the housing; and
a cord coupled to at least a bottom portion of the housing relative to the device being positioned upright on a surface, the cord protruding from at least a portion of the device near the bottom portion of the housing, the cord being manipulable to actuate the light, the cord being of a length not to exceed a distance from a point at which the cord couples to the bottom portion of the housing to the top of the surface when the device is placed with a back portion of the housing on the surface.

22. The device of claim 21, comprising a spherical element coupled to a first end of the cord opposite a second end of the cord at which the cord couples to the bottom portion of the housing, the length of the cord not exceeding the distance and a combined length of the cord and spherical element relative to the point exceeding the distance by a radius of the spherical element.

\* \* \* \* \*